O. B. JAMES.
END GATE FOR WAGONS.
APPLICATION FILED FEB. 11, 1916.
1,247,538.
Patented Nov. 20, 1917.
2 SHEETS—SHEET 1.
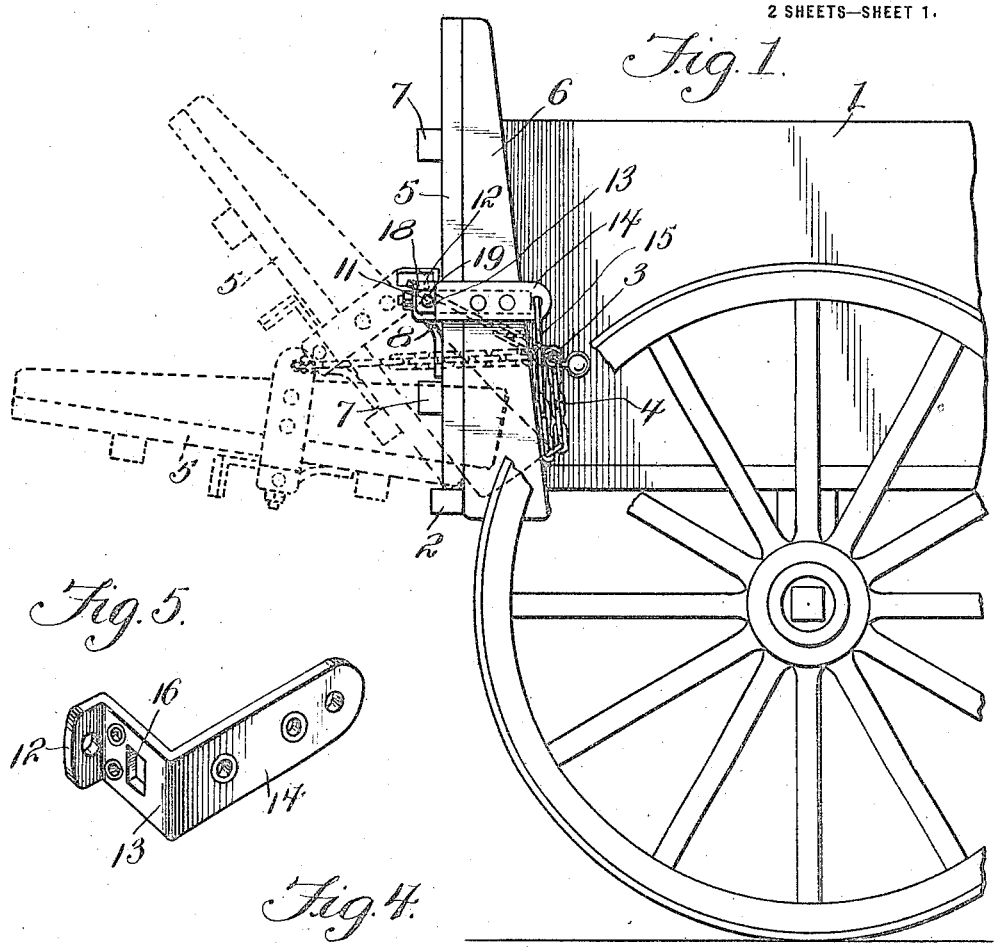
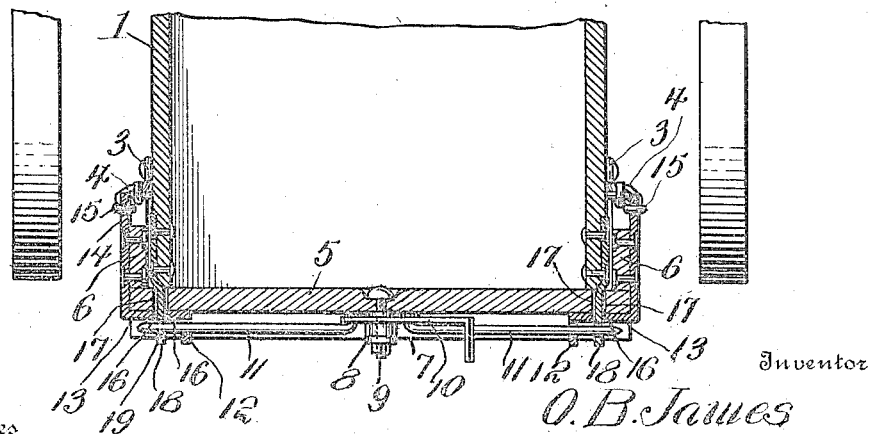
Witnesses
J. L. Wright
Inventor
O. B. James
By Victor J. Evans
Attorney O. B. JAMES.
END GATE FOR WAGONS.
APPLICATION FILED FEB. 11, 1916.
1,247,538.
Patented Nov. 20, 1917.
2 SHEETS—SHEET 2.
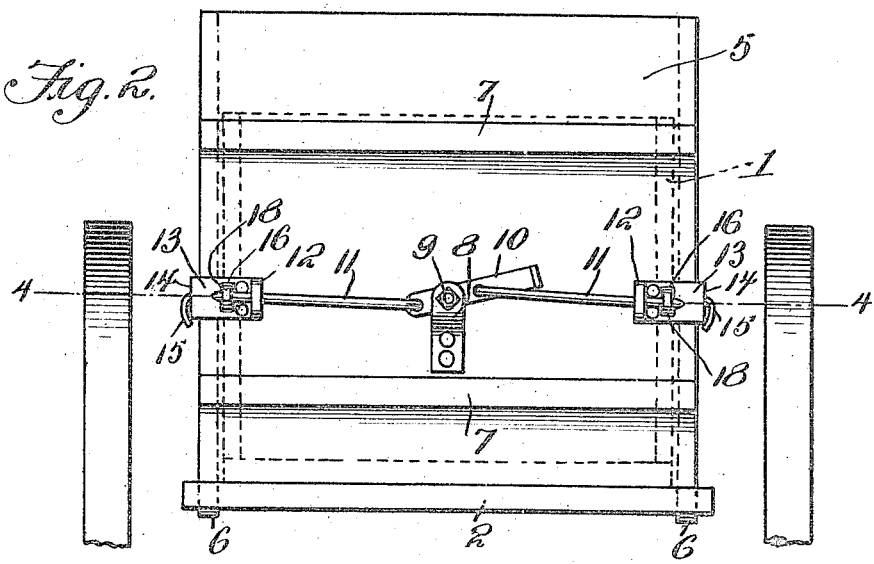
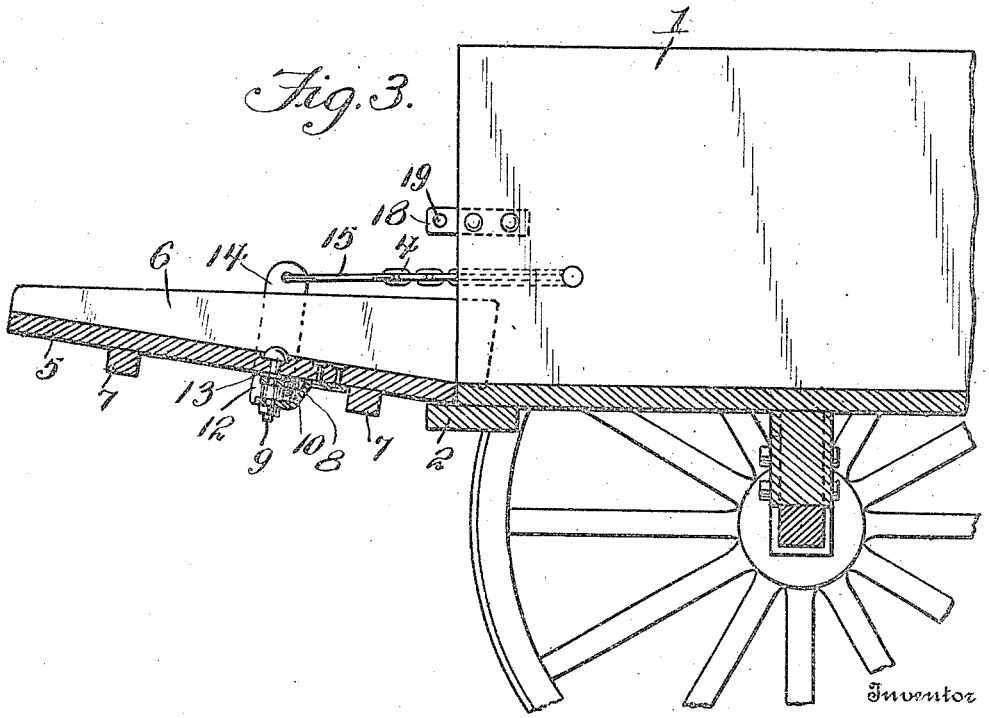
Witnesses
J. L. Wright
Inventor
O. B. James
By Victor J. Evans
Attorney

UNITED STATES PATENT OFFICE.

OVIETT B. JAMES, OF KENT, IOWA.

END-GATE FOR WAGONS.

1,247,538. Specification of Letters Patent. Patented Nov. 20, 1917.

Application filed February 11, 1916. Serial No. 77,678.

*To all whom it may concern:*

Be it known that I, OVIETT B. JAMES, a citizen of the United States, residing at Kent, in the county of Union and State of Iowa, have invented new and useful Improvements in End-Gates for Wagons, of which the following is a specification.

This invention relates to improvements in end gates for wagons.

An object of the invention is to improve the construction of end gates for farm wagons and to provide a simple and comparatively inexpensive means for securely fastening an end gate in its closed position, and for enabling the same to be readily inclined to a partially open position or lowered to a substantially horizontal position to form a scoop board.

Another object of the invention is to provide an end gate for farm wagons or the like which co-engages with the end bar or sill of the wagon in such a manner as to provide a fulcrum between the said end gate and the sill, so that the end gate is not hingedly or otherwise connected with the wagon at the lower edge of the said gate, adjustable means being provided between the gate and the sides of the wagon for retaining the said gate at any desired inclination with relation to the wagon and simple but effective means being arranged between the end gate and the wagon for locking the said gate to the wagon.

A further object of the invention is to improve and simplify the construction of devices of this character and to increase the efficiency and durability thereof.

With the above and other objects in view, the improvement resides in the construction, combination and arrangement of parts set forth in the following specification and falling within the scope of the appended claim.

In the drawings:

Figure 1 is a side elevation of a wagon provided with an end gate constructed in accordance with the present invention, the gate being illustrated in its closed position and being indicated by the dotted lines in both an inclined and a lower position.

Fig. 2 is an end elevation of the same,

Fig. 3 is a central vertical longitudinal sectional view with the gate in its lowered position, Fig. 4 is a horizontal sectional view approximately on the line 4—4 of Fig. 2, and Fig. 5 is a detail perspective view of a portion of the end gate.

Like characters of reference designate corresponding parts throughout the several views.

In the drawings, a portion of an ordinary wagon body is indicated by the numeral 1, the same having at its end, the usual transverse bar or sill 2, which extends a suitable distance beyond its sides. The sides of the body, adjacent its ends have secured thereon each a suitable hook 3 each of which is adapted to receive one of the links of chain members 4.

The end gate is indicated by the numeral 5, the same being provided at its opposite sides with wings 6 and being reinforced by upper and lower transverse cleats 7—7. The wings 6 extend each a suitable distance beyond the lower edge of the body of the end gate and the said edge may be notched to permit of the mentioned lower edge resting upon the sill 2 and the projecting or notched portions of the wing engaging with the inner face of the said sill and by this means it will be noted that the end gate is fulcrumed upon the wagon body and that the employment of hinges or other securing elements is not necessitated. This arrangement is also desirable for the reason that the end gate may be readily removed from the wagon when desired.

Secured centrally to the outer face of the end gate 5 between the cleats 7—7 is a vertically arranged bracket member 8, the said bracket being provided with a pivot member 9 which passes through an opening adjacent one of the ends of a lever 10. This lever at equal distances to the opposite sides of the pivot 9 has connected thereto oppositely arranged transversely disposed locking rods or bolts 11—11. The free ends of these bolts are received in openings provided in the flanged ends 12 of plates 13. These plates are secured both to the outer face of the end gate and are bent to extend laterally over the wings 6 and being also secured to the said wings. These extensions, indicated by the numerals 14 have their ends provided with openings to receive eyes formed in the ends of short rods 15, the free ends of the rods being likewise bent to provide eyes which receive the end links of the respective chain members 4. The plates 13, adjacent their flanges 12 are formed with slots 16 which aline with similar slots 17 in the end gate and the alining slots are disposed to receive keeper arms 18—18 which are secured to the sides of the wagon body. The outer ends of these keeper members 18 are provided with openings 19 which are arranged to receive the ends of the locking rods 11 when the lever 10 is swung in one direction.

By operating the lever to actuate the locking rods or bolts the end gate may be securely connected with the wagon or the same may be permitted to assume an inclination with relation to the wagon. The chains are regulated to have certain of their links received in the hook members 3 to retain the gate at the desired inclination, and the chains and the short rods 15 are of such a length that when the end links are engaged with the hooks 3, the end gate may be swung to its open position to form a scoop board. When in this position it will be noted that the ends of the gate 5 will engage with the end of the bottom or floor board of the wagon body, while the outer and lower edge of said gate will rest upon the sill. When the gate is in this position any weight upon the same owing to the slight inclination which the said gate assumes with relation to the wagon will cause the lower or inner end of the said gate to be brought more firmly into contact with the end of the wagon so that a close joint will be provided between the said gate and the said wagon.

Having thus described the invention, what I claim is:

The combination with a wagon provided with an end gate, of angle plates secured to the sides of the end gate, said plates each comprising a securing portion, a right angularly disposed portion adapted to lie against the outer face of the end gate, said last mentioned portion being provided with an opening and a laterally extending terminal portion also provided with an opening, keeper members carried by the wagon body and adapted to extend through openings in the end gate and the right angularly disposed portions to the said plates, said keeper members being each formed with an opening which is adapted to aline with the opening in each of the laterally extending terminal portions of the said angle plates and a locking element adapted to engage the alined openings to lock the end gate in its closed position.

In testimony whereof I affix my signature in presence of two witnesses.

OVIETT B. JAMES.

Witnesses:
D. A. DOUGHERTY,
W. H. KEYSER.

Copies of this patent may be obtained for five cents each, by addressing the "Commissioner of Patents, Washington, D. C."